2 Sheets—Sheet 1.
J. MAUCK.
PORTABLE HAY PRESS.
No. 65,249. Patented May 28. 1867.
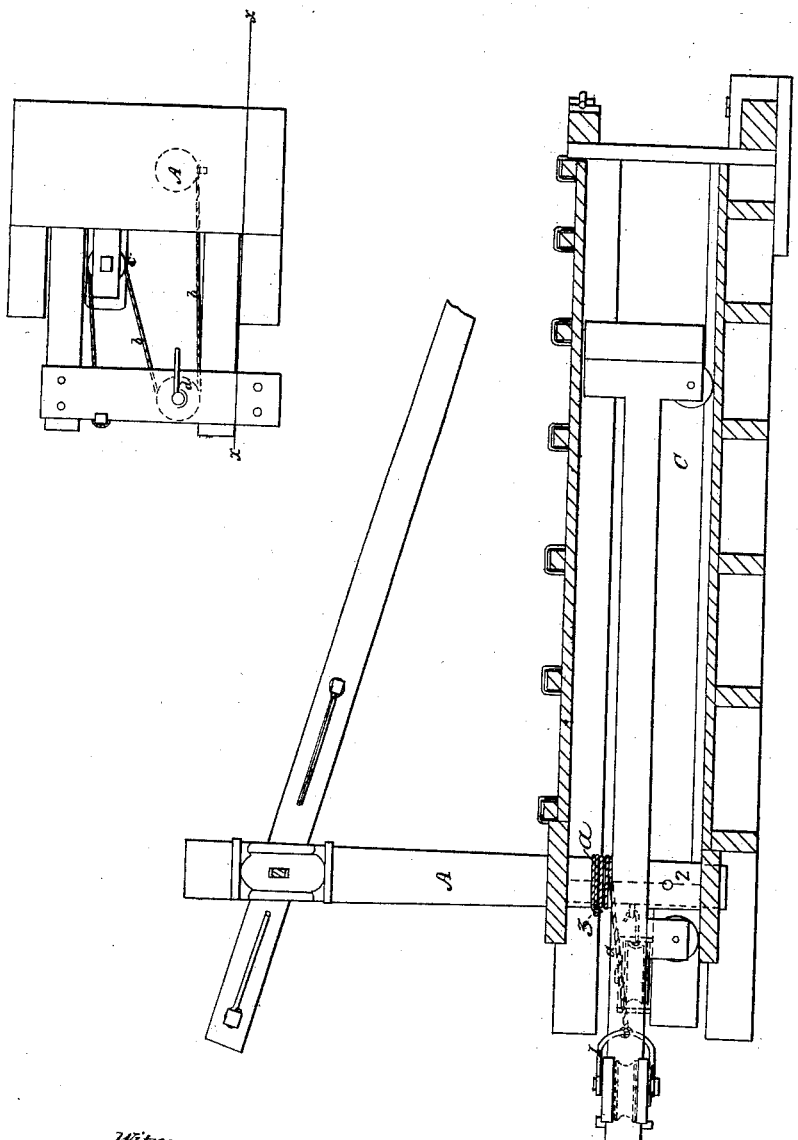
Witnesses.
Inventor

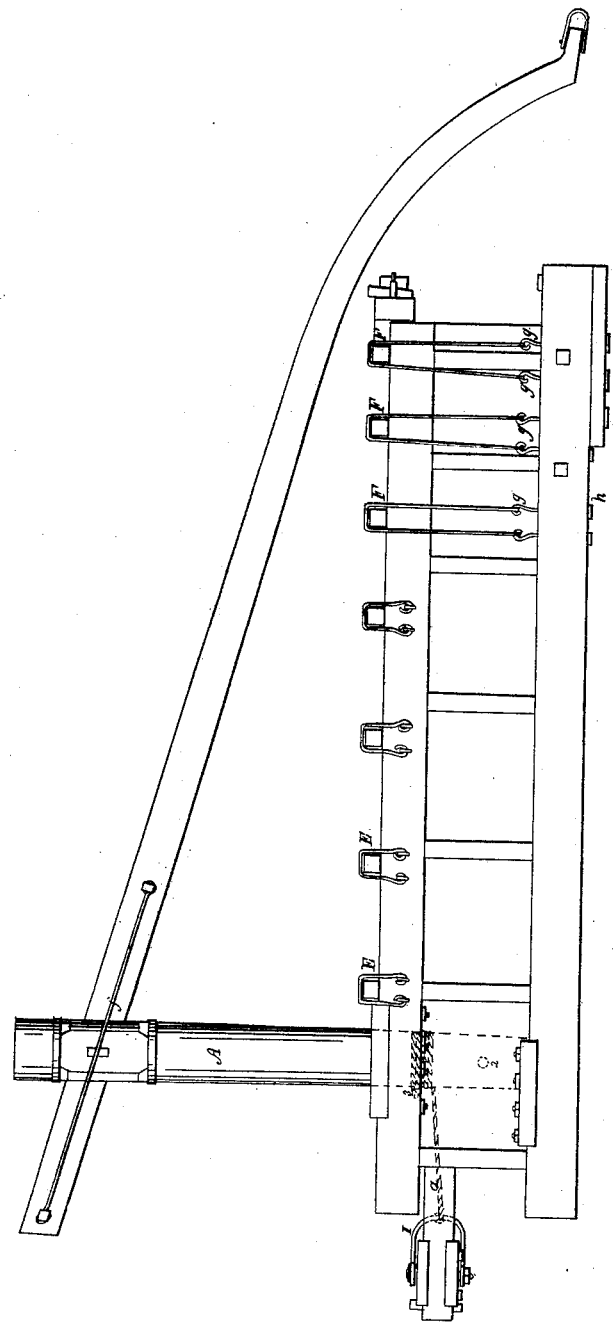

United States Patent Office.

JACOB MAUCK, OF CHESHIRE, OHIO.

Letters Patent No. 65,249, dated May 28, 1867.

IMPROVEMENT IN PORTABLE HAY-PRESS.

The Schedule referred to in these Letters Patent and making part of the same.

TO ALL WHOM IT MAY CONCERN:

Be it known that I, JACOB MAUCK, of Cheshire, in the country of Gallia, and State of Ohio, have invented a new and useful Improvement on the Portable Hay-Press; and I do hereby declare that the following is a full and accurate description of the construction and operation of the same, reference being had to the accompanying drawings, and to the letters of reference marked thereon.

The nature of my invention consists in the application of pulley $d$, clevis I, and six stirrups F, and hooks $g$, two braces $f$, and pin 2, and the arrangement of fastening and loosing ropes $a$ and $b$ to capstan A.

To enable others skilled in the art to make and use my invention, I will proceed to describe its construction and operation.

I construct my hay-press after the usual form of the portable hay-press, excepting the parts before referred to. The portable hay-press in use heretofore had but one pulley $c$, and rope $a$, made fast at the lower end of capstan A, passed to and over pulley $c$, and to block $k$, there being made fast to said block. The capstan A was then turned, and the rope began winding at the lower end upward until bale of hay was pressed, thus the rope at each round chafing or cutting from the necessary proximity thereof; but I obviate this difficulty, as well as gain one-third power in pressing, by arranging my ropes $a$ and $b$ and the pulley $d$, as follows: attach rope $a$, to pin 3, and fasten the opposite end to clevis I; then turn the capstan A to the right twice and one-half round, and the pin 2 appears; I then loop the end of rope $b$ on pin 2, and it having been adjusted over pulleys $c$ and $d$, and made fast at the other end at $e$, I then turn the lever to the left twice and one-half round, and the bale is completely pressed; the carriage C to be run back by hand, and the ropes adjusted as before pressing.

What I claim as my invention, and desire to secure by Letters Patent, is—

A hay-press, having capstan A, ropes $a$ and $b$, pulleys $c$ and $d$, clevis I, pins 2 and 3, carriage C, stirrups F, hooks $g$ $g$, and braces $f$, constructed, combined, and operating substantially as herein specified.

JACOB MAUCK.

Witnesses:
T. W. HAMPTON,
I. T. AGEE.